United States Patent

Endo et al.

[11] Patent Number: 6,063,997
[45] Date of Patent: May 16, 2000

[54] GAS INSULATED ELECTRIC APPARATUS

[75] Inventors: Fumihiro Endo; Tomoaki Utsumi; Toshio Ishikawa; Shuzo Iwaasa; Tokio Yamagiwa, all of Hitachi, Japan

[73] Assignee: Hitachi, Ltd., Tokyo, Japan

[21] Appl. No.: 08/290,083

[22] Filed: Aug. 15, 1994

Related U.S. Application Data

[63] Continuation of application No. 07/760,947, Sep. 17, 1991, abandoned.

[30]    Foreign Application Priority Data

Sep. 17, 1990  [JP]  Japan .................................. 2-243733

[51] Int. Cl.⁷ .................................................. H02G 15/20
[52] U.S. Cl. .................... 174/11 R; 174/14 R; 174/15.1; 174/16.2; 174/17 GF; 174/25 G; 174/26 G
[58] Field of Search ............................... 174/11 R, 14 R, 174/15.1, 16.1, 16.2, 17 GF, 25 G, 26 G

[56]          References Cited

U.S. PATENT DOCUMENTS

| | | | |
|---|---|---|---|
| 2,040,204 | 5/1936 | Emanuelt | 174/11 R |
| 3,403,063 | 9/1968 | Walker | 174/25 G X |
| 4,257,905 | 3/1981 | Christophorous et al. | 174/17 GF X |
| 4,320,035 | 3/1982 | Harrold | 174/15.1 X |
| 4,565,901 | 1/1986 | Hirooka et al. | 174/17 GF |
| 4,607,245 | 8/1986 | Kuroda et al. | 174/11 R X |
| 5,146,170 | 9/1992 | Ishikawa et al. | 324/536 |

FOREIGN PATENT DOCUMENTS

| | | |
|---|---|---|
| 0108984 | 5/1984 | European Pat. Off. . |
| 0174905 | 8/1985 | European Pat. Off. . |
| 0203252 | 12/1986 | European Pat. Off. . |
| 3543450 | 6/1986 | Germany .......................... 174/17 GF |
| 0024830 | 7/1971 | Japan .................................. 174/11 R |

OTHER PUBLICATIONS

Mulcahy et al. "A Review of Insulation Breakdown and Switching in Gas Insulation", Aug. 1970, pp. 55–61, 174–25G.

*Primary Examiner*—Hyung-Sub Sough
*Attorney, Agent, or Firm*—Antonelli, Terry, Stout & Kraus, LLP

[57]          ABSTRACT

In a gas insulated electric apparatus having gas sections filled with insulating gas, a locating device determines a position of a gas section in which an insulation abnormality is detected, on the basis of a detection signal from sensors disposed in each of predetermined gas sections. At the same time a hindering degree diagnosing device diagnoses the degree and the kind of the insulation abnormality, by comparing a detection signal from the sensors with data stored in a data base. A valve control generates a valve control signal, responding to the locating device and the hindering degree diagnosing device, and in response to the valve control signal, a trip circuit generates a valve opening signal to open an electromagnetic valve disposed in a gas section in which an insulation abnormality is detected. An insulating gas injecting and evacuating device injects an insulating gas, different from the initial insulating gas with which the gas sections are filled beforehand, into the gas section for which the electromagnetic valve has been opened by the valve opening signal, or evacuates a predetermined amount of the insulating gas with which the gas sections are filled beforehand, so as to increase insulation strength.

18 Claims, 7 Drawing Sheets

F I G. 10
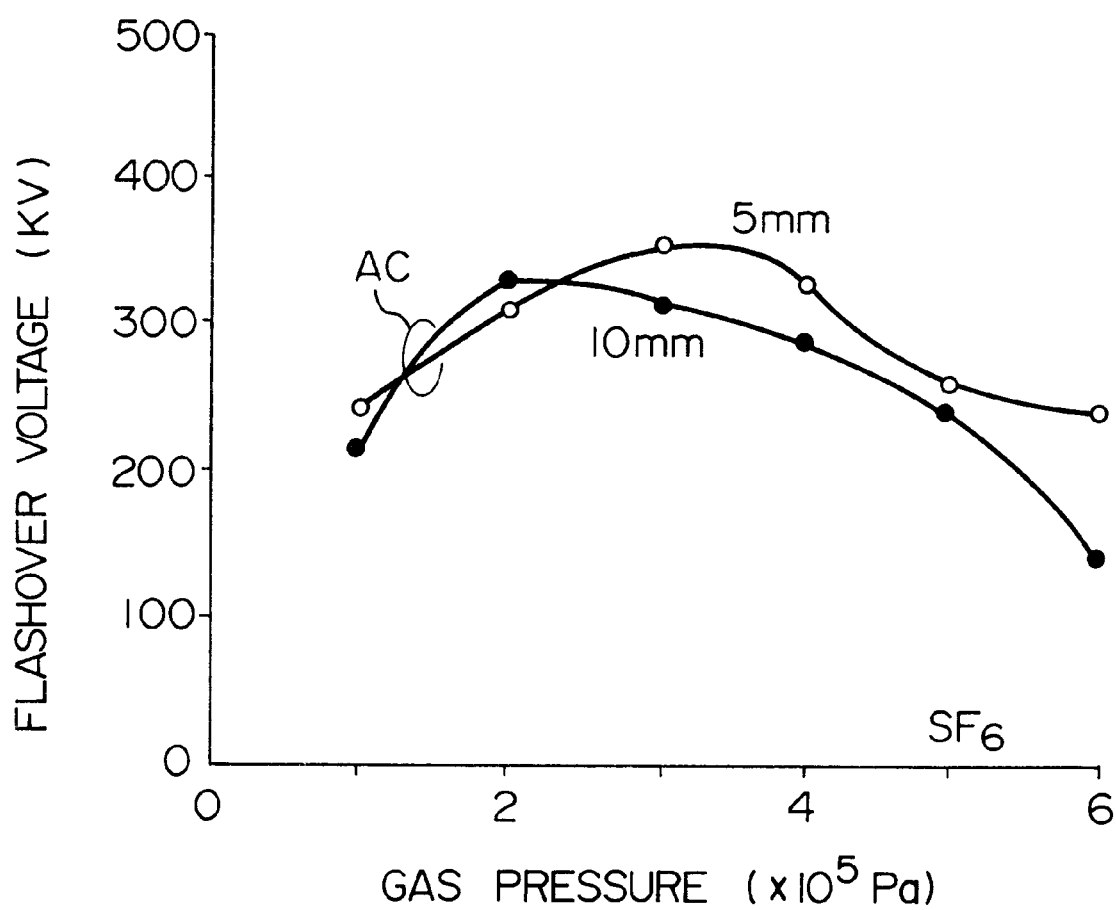

GAS INSULATED ELECTRIC APPARATUS

This application is a Continuation of application Ser. No. 07/760,947, filed Sep. 17, 1991, now abandoned.

BACKGROUND OF THE INVENTION

The present invention relates to a gas insulated electric apparatus, in which a high voltage conductor is disposed in a sealed vessel filled with insulating gas.

In general, this kind of gas insulated electric apparatus can be constructed in a small size owing to the excellent insulating characteristics of insulating gas, as shows by a gas insulated circuit breaker, a gas insulated switchgear, a gas insulated thyristor valve, a gas insulated voltage transformer, etc. However, it is known that, if foreign metallic matter enters the sealed vessel for some reason, the insulation strength thereof is lowered to a fraction of the initial value.

For example, in a gas insulated electric apparatus disclosed in JP-A-63-124716, it is proposed to store insulating liquid at the bottom of a sealed vessel and to excite an ultrasonic vibrator when insulation abnormalities such as partial discharge, etc. are produced, to give rise to mist (liquid particles of several $\mu$m to several tens of $\mu$m) of the insulating liquid in order to prevent lowering of insulation strength to suppress the partial discharge.

As described above, in a prior art gas insulated electric apparatus, since lowering of insulation strength is prevented by giving rise to mist of insulating liquids when insulation abnormalities are produced, an insulating liquid storing portion is formed at the lower portion of a sealed vessel. For this reason, in a normal state, the sealed vessel is filled with vapor of the insulating vapor. If a circuit breaker or a disconnecting switch or an earthing switch is operated and an arc is generated in this state, the vapor is decomposed by the arc, and carbon dissociated at this time adheres to the high voltage conductor or insulator, which lowers the insulation strength.

SUMMARY OF THE INVENTION

The object of the present invention is to provide a gas insulated electric apparatus which avoids lowering of the insulation strength in a normal state (a state, in which there is neither mixing nor production of metallic foreign matter, etc. and there are no abnormalities in the insulation) and at the same time suppresses lowering of the insulation strength in an insulation abnormal state.

In order to achieve the above object, a gas insulated electric apparatus according to the present invention is characterized by detecting means for detecting a gas section of the gas insulated electric apparatus where insulation abnormalities are found, and gas control means connected with the gas section through an electromagnetic valve. The gas control means opens the electromagnetic valve at detection by the detecting means of a gas section where insulation abnormalities are found to vary the insulating gas in the gas section from a nominal state so as to increase the insulation strength.

Since the gas insulated electric apparatus according to the present invention is constructed as described above, in the normal state the insulation is maintained by the nominal state of the insulating gas in the gas section. On the other hand, when insulation abnormalities are produced in the gas section, the electromagnetic valve is opened, and the gas control means is operated so as to increase the insulation strength either by increasing gas pressure in the gas section to a predetermined value or by mixing a different kind of gas therein. For this reason, the ionization coefficient on an electron attachment cross section is varied, and the space charge formed by a partial discharge is also varied, so that it is possible to prevent lowering of the insulation strength due to electric field concentration at the end of a metallic foreign particle or a protrusion causing insulation abnormalities. That is, in a non-uniform electric field, space charge generated by partial discharge exists locally at the electric field concentration part, which mitigates the electric field concentration (corona stabilizing action). This action is particularly good at pressures under $4 \times 10^5$ Pa and disappears over $6 \times 10^5$ Pa. Consequently, when the gas pressure is decreased below a predetermined value, the insulation strength is increased. Further, when a different kind of gas is mixed therein, since the capability of capturing electrons is increased and it becomes more difficult to obtain ionization energy, the insulation strength is increased.

BRIEF DESCRIPTION OF THE DRAWINGS

FIG. 10 is a graph showing the relation between the insulating gas pressure and the flashover voltage in the apparatus of FIG. 9.

DESCRIPTION OF THE PREFERRED EMBODIMENTS

Figure 1:
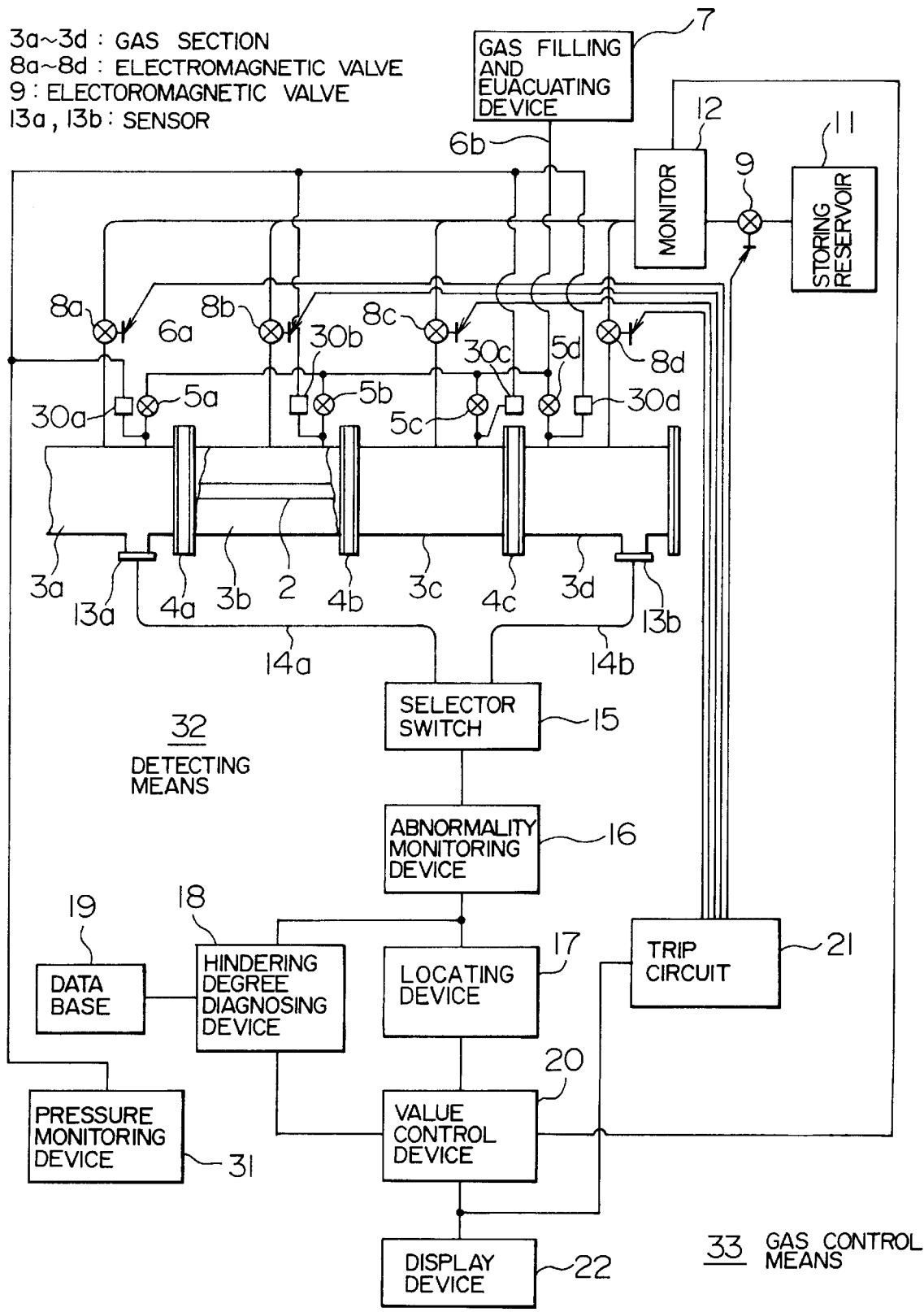
FIG. 1 is a block diagram of a first embodiment of an apparatus according to the present invention.

Hereinbelow several embodiments of the present invention will be described, referring to the drawings.

FIG. 1 is a block diagram depicting a gas insulated electric apparatus according to a first embodiment of the present invention.

A sealed vessel, the interior of which is filled with insulating gas consisting of only $SF_6$ gas (mixed gases consisting of $SF_6$ and other insulating gases being not used in practice), is sectioned into a plurality of gas sections 3a, 3b, 3c, 3d by insulating spacers 4a, 4b, 4c disposed with suitable intervals. A high voltage conductor 2, serving as a path for high voltage and large current, is supported by the insulating spacers 4a to 4c within this sealed vessel. Closing valves 5a to 5d, which open and close manually, connect respective gas sections 3a, 3b, 3c, and 3d with a gas filling and evacuating device 7 for effecting filling with insulating gas of $SF_6$ gas and evacuation in vacuum through piping 6a and 6b. The gas filling and evacuating device 7 includes a vacuum pump, a compressor and a reserve tank. Electromagnetic valves 8a to 8d connect the respective gas sections 3a, 3b, 3c, and 3d with a storing reservoir 11 through a piping 10 and, in the course of the piping 10, an electromagnetic valve 9 and a monitor 12 for measuring the amount of gas flowing in. This storing reservoir 11 is filled with an insulating gas of a kind different from the insulating gas filling the sealed vessel. The insulating gas filling the storing reservoir 11 can flow into a predetermined gas section by opening electromagnetic valve 9 and the corresponding one of the electromagnetic valves 8a to 8d. Preferably, either one of fluoro-carbon gases ($C_4F_8$, $C_3F_8$, $C_3F_6$, $C_4F_6$), pentafluoro-propionyl fluoride ($C_2F_5COF$), carbon fluoride nitrile compounds ($CF_3CN$, $C_2F_5CN$), bromoclorodifluoromethan F-12B1 ($CBrClF_2$), etc., or a gas whose main component is one of them, is used for the insulating gas filling storing reservoir 11.

Pressure relays 30a, 30b, 30c and 30d detect the pressure of the insulating gas in the interior of the gas sections 3a, 3b, 3c and 3d, respectively, and the outputs thereof are led to a pressure monitoring device 31 so that normal pressures or abnormal pressures are displayed on this pressure monitoring device 31 and an alarm is given at abnormalitiles. However, in the case where a nominal state of the insulating gas for a certain gas section, i.e. the filling condition in the nominal state, is varied (in the case where insulation abnormalities are produced and the gas pressure in that gas section should be lowered or a different kind of gas should be mixed therein), the pressure monitoring device 31 receives in a signal from a locating device 17 so as to remove the locking for the relevant gas section so that no alarm is given.

In predetermined gas sections 3a and 3d there are disposed sensors 13a and 13b, respectively, which detect insulation abnormalities produced in the interior thereof. The outputs thereof are led out through cables 14a and 14b, respectively, and are connected with an abnormality monitoring device 16 through a selector switch 15. That is, the outputs of the sensors 13a and 13b are inputted selectively or alternately into the abnormality monitoring device 16 by means of the selector switch 15. The output of this abnormality monitoring device 16 is connected with the locating device 17 and with a hindering degree diagnosing device 18, which diagnoses the kind and the degree of the abnormalities. The abnormalities include e.g. metallic foreign matter, conductive foreign matter, semiconductive foreign matter, protrusions on a conductor, and extremely small gaps between a solid insulator and a conductor. The degree of the abnormalities includes, e.g. in the case of metallic foreign matter, a case where insulation strength decreases with increasing length thereof or a case where insulation strength varies, depending on the position where the abnormalities exist. The locating device 17 calculates the position where the abnormalities are produced, using the outputs of the sensors 13a and 13b, and recognizes the gas section including that position. The output thereof is inputted into a valve control device 20, and the output of the valve control device 20 is sent to a trip circuit 21 for opening and closing the corresponding electromagnetic values 8a to 8d and 9. At this time, the duration of the opening of the relevant electromagnetic valve is determined by comparing results of a diagnosis by the hindering degree diagnosing device 18 with a data base 19 determining the amount of insulating gas, which is to be injected from the storing reservoir 11 for increasing insulation strength, depending on the kind and the degree of the abnormalities. On the basis thereof, the valve control device 20 outputs an opening signal to a predetermined electromagnetic valve 8a to 8d or 9 only during a predetermined time. Further the valve control device 20 watches the amount of inflow by means of the monitor 12 and gives the relevant electromagnetic valve a closing signal when the amount of injected gas reaches a predetermined value.

The output of the valve control device 20 is inputted into a display device 22 so that this display device displays the identification of the gas section where abnormalities are produced, the opened or closed state of the electromagnetic valves 8a to 8d and 9, the purity and the pressure of the insulating gas injected into the gas section, and the insulation strength.

Next, the operation of the gas insulated electric apparatus indicated in FIG. 1 will be further explained, supposing that an insulation abnormality is produced in the gas section 3b.

Figure 2:
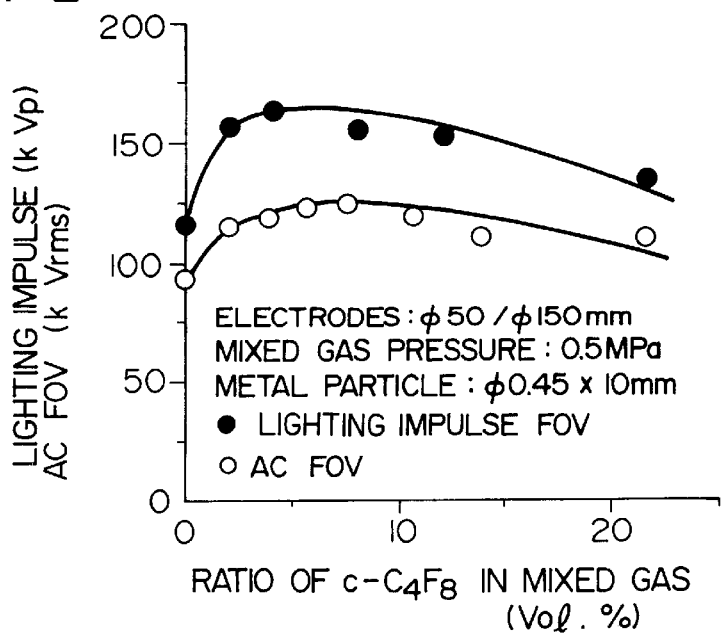
FIG. 2 is a graph indicating that flashover voltage is maximum in a mixed insulating gas at a particular mixing ratio.

This abnormality is detected by the sensors 13a and 13b and inputted into the abnormality monitoring device 16. The abnormality monitoring device 16 is informed of the generation of the abnormality and issues an instruction to the locating device 17 to locate the position where the abnormality is produced, using the signals outputted by the sensors 13a and 13b. In this way, for example, the gas section 3b is located. The method of location will be described more in detail as follows. An abnormality source produces partial discharge and an electromagnetic wave. Heat, vibration of the tank, a pulse voltage and current, light, and decomposition gas are generated by this discharge. The location is determined by utilizing at least one of these phenomena. For example, in the case where the electromagnetic wave is utilized, there are disposed at least two sensors and the calculation is effected, starting either from intensities of the signals detected by these sensors or from a difference between points of time when the electromagnetic wave arrives. Consequently, the sensors 13a and 13b, selector switch 15, abnormality monitoring device 16, and locating device 17 constitute detecting means for detecting the gas section where an insulation abnormality is produced. On the basis of the result of this, the valve control device 20 outputs to the trip circuit 21 an instruction to open the corresponding electromagnetic valve, e.g. valve 8b, and the electromagnetic valve 9. Further, at the same time the hindering degree diagnosing device 18 diagnoses the degree and the kind of the abnormality, based on the output signals of the sensors 13a and 13b, and the valve control device 20 decides the amount of insulating gas to be injected by comparing it with the optimum amount of insulating gas to be injected as stored in the data base 19. For example, when metallic foreign matter 10 mm long enters a space comprised between coaxial cylindrical electrodes in which the inner electrode has an outer diameter of 50 mm and the outer electrode has an inner diameter of 150 mm, and the space is filled with $SF_6$ of $5 \times 10^5$. The AC flashover voltage is lowered to 100 $kV_{rms}$, and the lightning impulse flashover voltage is lowered to 120 kV. When there is no foreign matter, the flashover voltage is higher than 600 $kV_{rms}$ for AC and 800 kV for lightning impulse voltages. When c-$C_4F_8$ is mixed in $SF_6$, as indicated in FIG. 2, the flashover voltage is a maximum at a particular mixing ratio, which is about 7% for AC and about 5% for lightning impulse voltages. Consequently, when c-$C_4F_8$ is mixed at 5 to 7%, the flashover voltage can be increased by 25% for AC and by 45% for lightning impulse voltages. If the mixing ratio is too great or too small, the effect is decreased, and therefore there exists a certain optimum mixing ratio. When the amount of injected gas reaches a predetermined value, while watching it by means of the monitor 12, the valve control device 20 gives the electromagnetic valves 8b and 9 an instruction to close. Consequently, it can be understood that gas control means 33 is constituted by several devices, the valve control device 20 described above serving as the center thereof.

Figure 3:
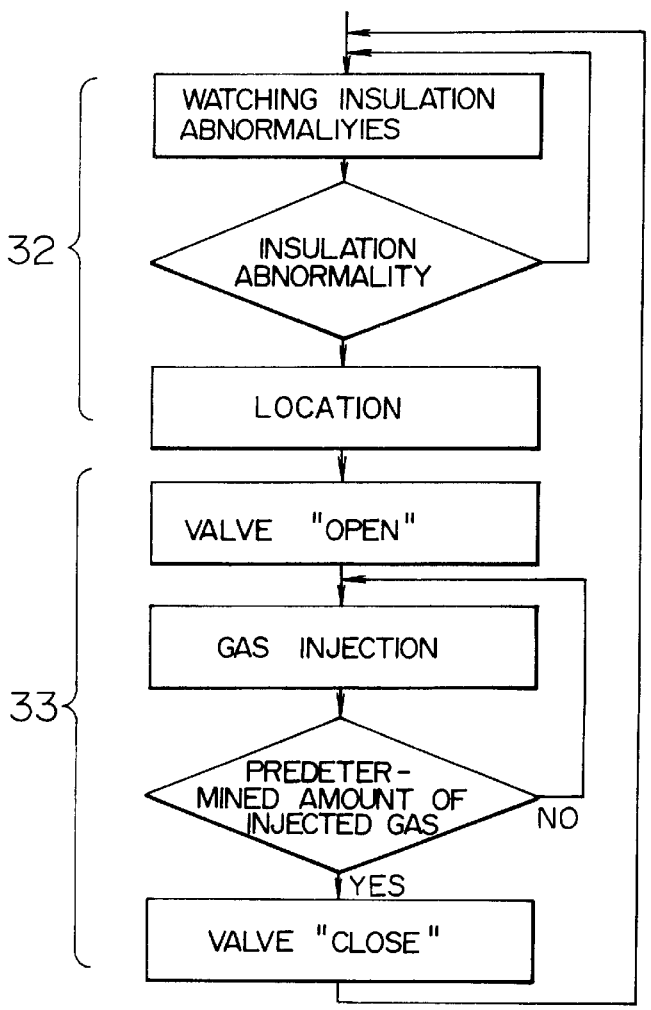
FIG. 3 is a flow chart indicating the operation of the apparatus according to the present invention as depicted in FIG. 1.

FIG. 3 is a flow chart indicating the operation described above. The detecting means 32 watches insulation abnormalities, and when an insulation abnormality is produced, it works to locate the gas section including the position where the abnormality originated. On the other hand, the gas control means 33 obtains the amount of insulating gas to be injected, on the basis of the location as well as the degree and the kind of the abnormality, and effects opening and closing control of the electromagnetic valves 8a to 8b, 9, corresponding thereto.

After the injection of the insulating gas stored in the storing reservoir 11 as described previously, whatever insulating gas is used among those described previously, insulation strength can be obtained which is higher than that obtained in the rated condition of the insulating gas in the gas section 3b, i.e. in the initial filling state. Hereinbelow further explanation will be made with this respect.

At first explanation will be made for the case where a fluorocarbon gas, i.e. freon C318 having a molecular formula $C_4F_8$, is used for the insulating gas.

Figure 4:
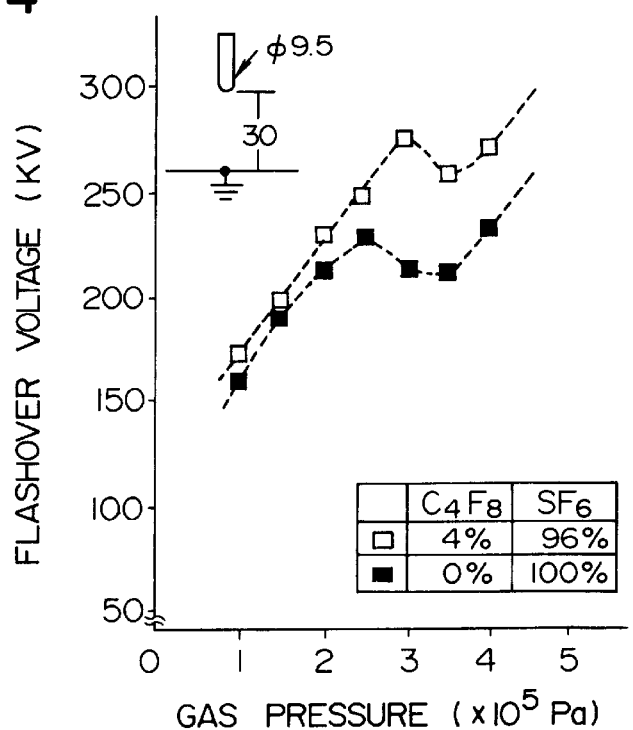
FIGS. 4 to 7 are graphs showing the relation between the mixed insulating gas and the flashover voltage in the apparatus of FIG. 1.

This freon C318 has a boiling point of −6° C. and a vapor pressure of $1.2 \times 10^5$ Pa at 0° C. The amount, which can be mixed in $SF_6$ gas at a pressure of $5 \times 10^5$ Pa, used generally in gas insulated electric apparatuses without being liquefied, is 18% at 0° C. As indicated in FIG. 4, the flashover voltage in a mixed gas, for which freon C318 is injected in $SF_6$ gas at 4%, is increased by more than 20% with respect to that obtained in pure $SF_6$ gas, when a rod having a diameter of 9.5 mm and a gap length of 30 mm-plane electrode is used. Detail of this experiment is reported in Gaseous Dielectrics III (1982) pp. 166–172.

Figure 5:
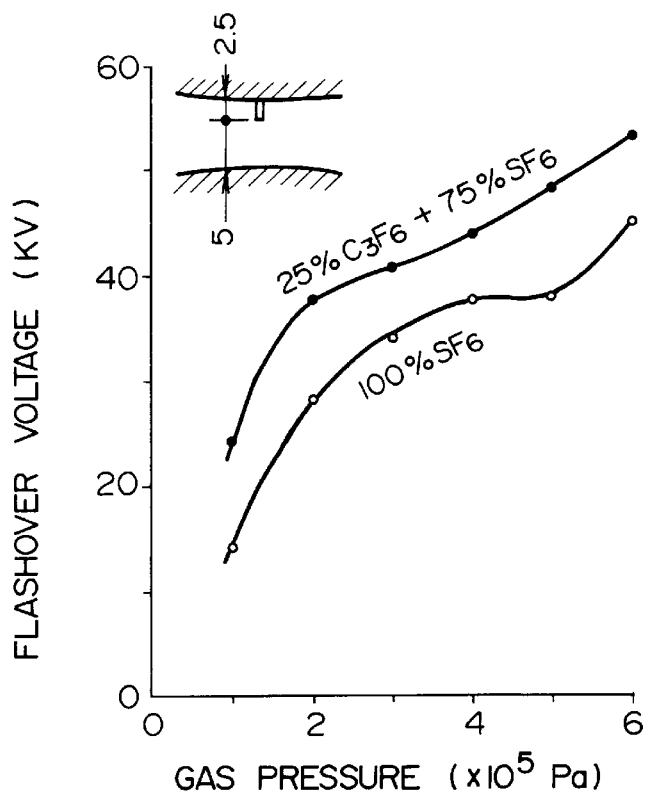

When hexafluoropropylene having a molecular formula $C_3F_6$ is used as a fluorocarbon gas for the insulating gas, this hexafluoropropylene has a boiling point of −29° C., a vapor pressure of $3.4 \times 10^5$ Pa at 0° C., and the amount which can be mixed in $SF_6$ at $5 \times 10^5$ Pa without being liquefied is greater than 50% at 0° C. As indicated in FIG. 5, the flashover voltage in a mixed gas, for which hexafluoropropylene is injected in $SF_6$ gas at 25%, is increased by more than 20% with respect to that obtained in pure $SF_6$ gas, when a spherical electrode having a protrusion 2.5 mm long is used. Detail of this experiment is reported in EPRIL Report EL-2620 pp. 4.42–4.55 (1982).

Figure 6:
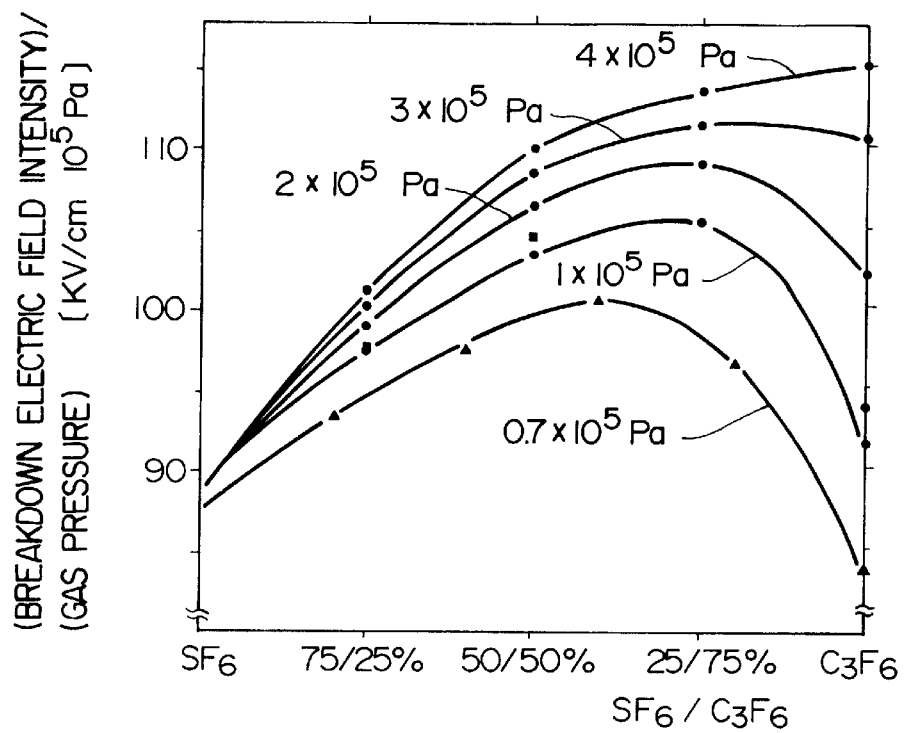

Further the breakdown electric field intensity is significantly increased with respect to that obtained in pure $SF_6$ gas by varying the gas pressure and the mixing ratio, as indicated in FIG. 6. Detail of this experiment is reported in 4th ISH No. 33-02 (1983).

An effect similar to that obtained with the mixed gas can be obtained, also in the case where hexafluoro-2-butane having a molecular formula $C_4F_6$ is mixed as the fluorocarbon gas in $SF_6$ gas.

Now, taking into account the case where pentafluoropropionyl fluoride having a molecular formula $C_2F_5COF$ is used for the insulating gas, this gas has a boiling point lower than −20° C. and a vapor pressure of $2.9 \times 10^5$ Pa at 0° C. and it is possible to mix it in $SF_6$ gas up to a ratio near 50%.

Figure 7:
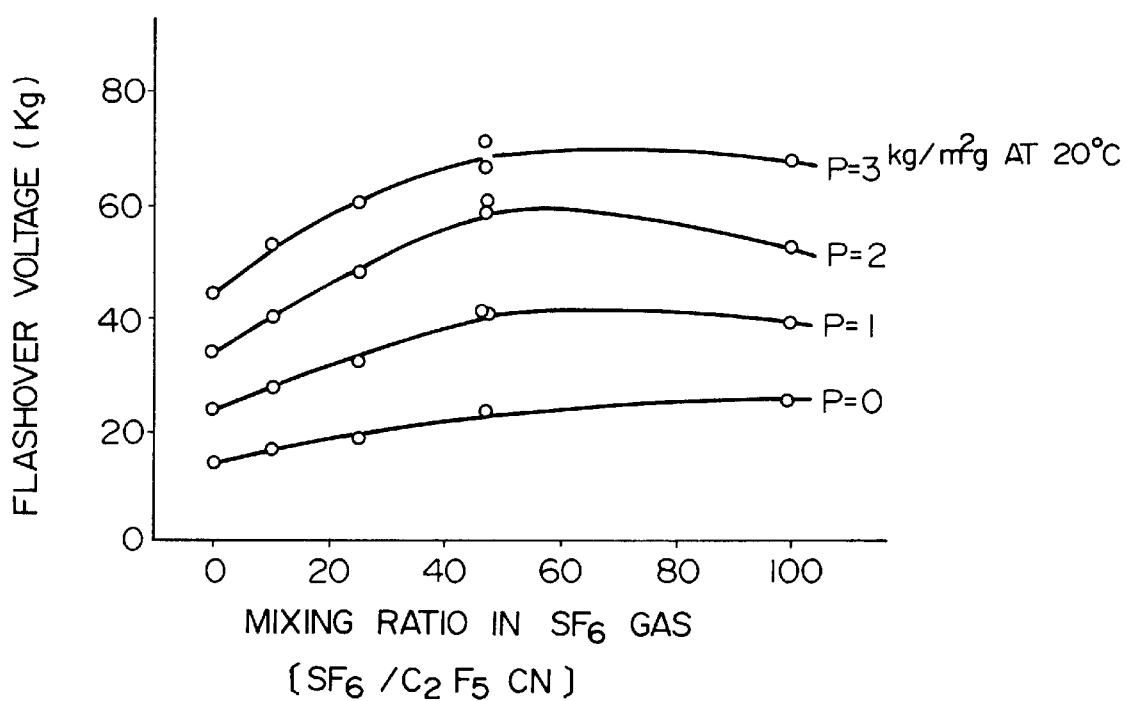

Further, pentafluoropionitrile having a molecular formula $C_2F_5CN$ can be used as one of the carbon fluoride nitrile compounds. This is a liquid having a boiling point lower than −20° C. and a vapor pressure of $4.0 \times 10$Pa at 0° C., and it is possible to mix it in $SF_6$ gas at $5 \times 10^5$ Pa with a ratio greater than 50%. A mixed gas thereof in $SF_6$ gas can increase significantly the flashover voltage with respect to that obtained in pure $SF_6$ gas, as indicated in FIG. 7. Detail of this experiment is described in JP-A-60-2011.

An effect almost similar to that obtained for the mixed gases described previously is obtained also in the case where a mixed gas such as trifluoroacetonitrile having a molecular formula $CF_3CN$ or bromoclorodifluoromethan having a molecular formula $CBrClF_2$ mixed in $SF_6$ gas is used as one of the carbon fluoride nitrile compounds.

Characteristics of the various sorts of gases described above are brought together in the following table.

| MOLECULAR FORMULA | BOILING POINT (° C.) | VAPOR PRESSURE AT 0° C. ($\times 10^5$ Pa) | RELATIVE INSULATION STRENGTH WITH RESPECT TO NITROGEN |
|---|---|---|---|
| $C_4F_8$ | −6 | 1.2 | 2.9 |
| $C_3F_8$ | −37 | 3.9 | 1.7 |
| $C_3F_6$ | −29 | 3.4 | 2.3 |
| $C_4F_6$ | — | 1.1 | 4.1 |
| $C_2F_5COF$ | <−20 | 2.9 | 3.5 |
| $CF_3CN$ | <−20 | 14.8 | 3.1 |
| $C_2F_5CN$ | <−20 | 4.0 | 4.0 |
| $CBrClF_2$ | −4 | 1.1 | 2.4 |
| $SF_6$ | <−20 | 13 | 2.2 |

The storing reservoir 11 may be filled with mixed gas made up of more than two of the gases described above, at least one of the gases forming one component, or mixed gas of at least one of the gases with $SF_6$ gas. If insulation strength is improved to be higher than that of pure $SF_6$ gas under the condition of a non-uniform electric field, then a similar effect can be obtained from an insulating gas other than those on the list shown above.

Figure 8:
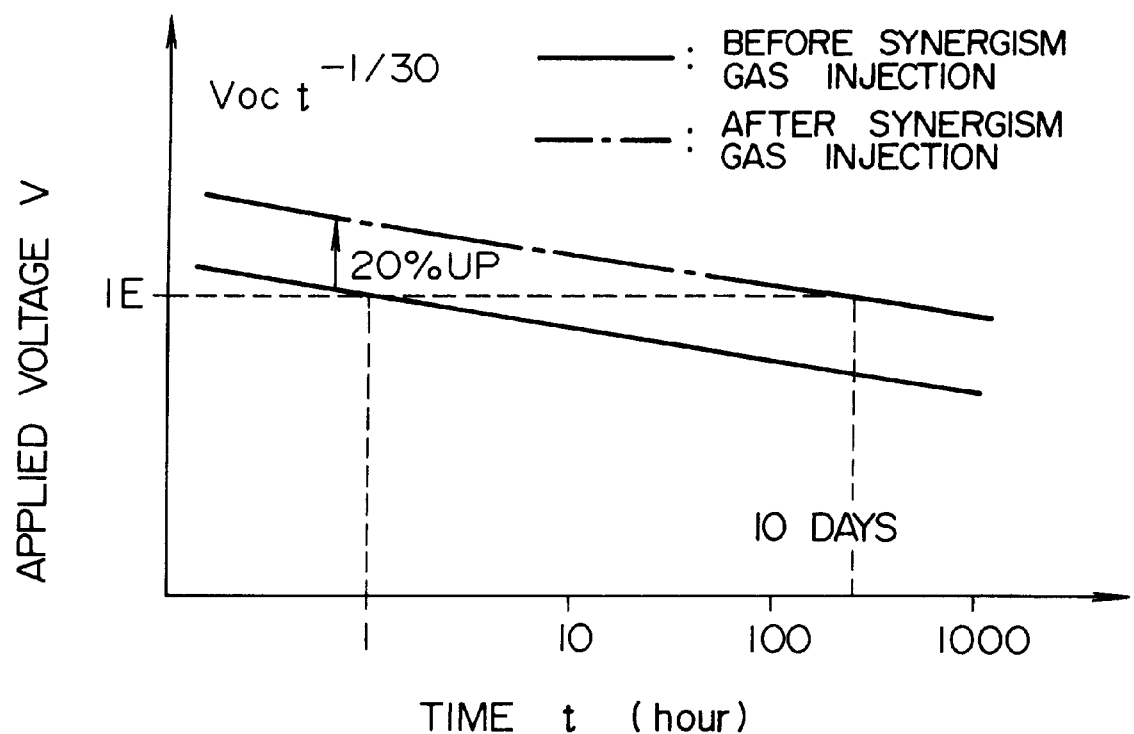
FIG. 8 indicates the relation between the time required until the insulating resisting forces decrease to certain identical values before and after an insulating gas injection.

As described above, since the insulating gas stored in the storing reservoir 11 indicated in FIG. 1 is mixed in $SF_6$ gas filling a gas section when insulation abnormalities are produced in the gas section, at the normal state the gas section is filled only with the predetermined $SF_6$ gas. Therefore it is not always exposed to an arc generated upon opening and closing operation of a disconnecting switch, an earth switch or a circuit breaker, and no substances, such as carbon, harmful to insulation are generated by decomposition thereof or precipitated. When insulation abnormalities are produced and the insulating gas stored in the storing reservoir 11 is injected, since the insulating gas can increase the insulating resisting power by about 15 to 20%, the insulation abnormalities can be avoided. In this way maintenance and inspection of places where insulation abnormalities are produced can be postponed, to be effected at a convenient time. For example, in the case where insulation abnormalities are produced by metallic foreign matter, since isolation strength V decreases with time t in accordance with the equation, $$V \alpha t^{-1/n} (n \approx 30);$$

insulating strength can be increased by 15 to 20% by injecting another kind of gas. Therefore, time required for lowering to the same isolation strength 1E is extended to a value about 100 times longer than time required when no other kind of gas is injected therein, as depicted in FIG. 8. Since the insulating substance injected from the storing reservoir 11 is gas, it pours easily also in a gas section connected through a slender pipe which is not shown, etc. When mist is produced as in a prior art case, it forms drops, which flow on the surface of insulating spacers and contaminate those parts. In contrast, according to the present invention such inconveniences do not take place at all.

In the embodiments described above, since the insulating gas from the storing reservoir 11 is injected in a gas section in which insulation abnormalities are produced, while the initial nominal pressure is kept as it is, the pressure after the injection becomes higher than the nominal pressure. However, a similar effect can be achieved, even if the gas pressure is kept equal to the nominal pressure, while maintaining the mixing ratio constant. Further, in all the embodiments described above, insulation strength of gas mixture is increased by injecting a different kind of insulating gas in the relevant gas section. However, insulation strength may be increased also by varying the gas pressure in the gas section, where insulation abnormalities are produced. This will be explained, referring to FIG. 9.

Figure 9:
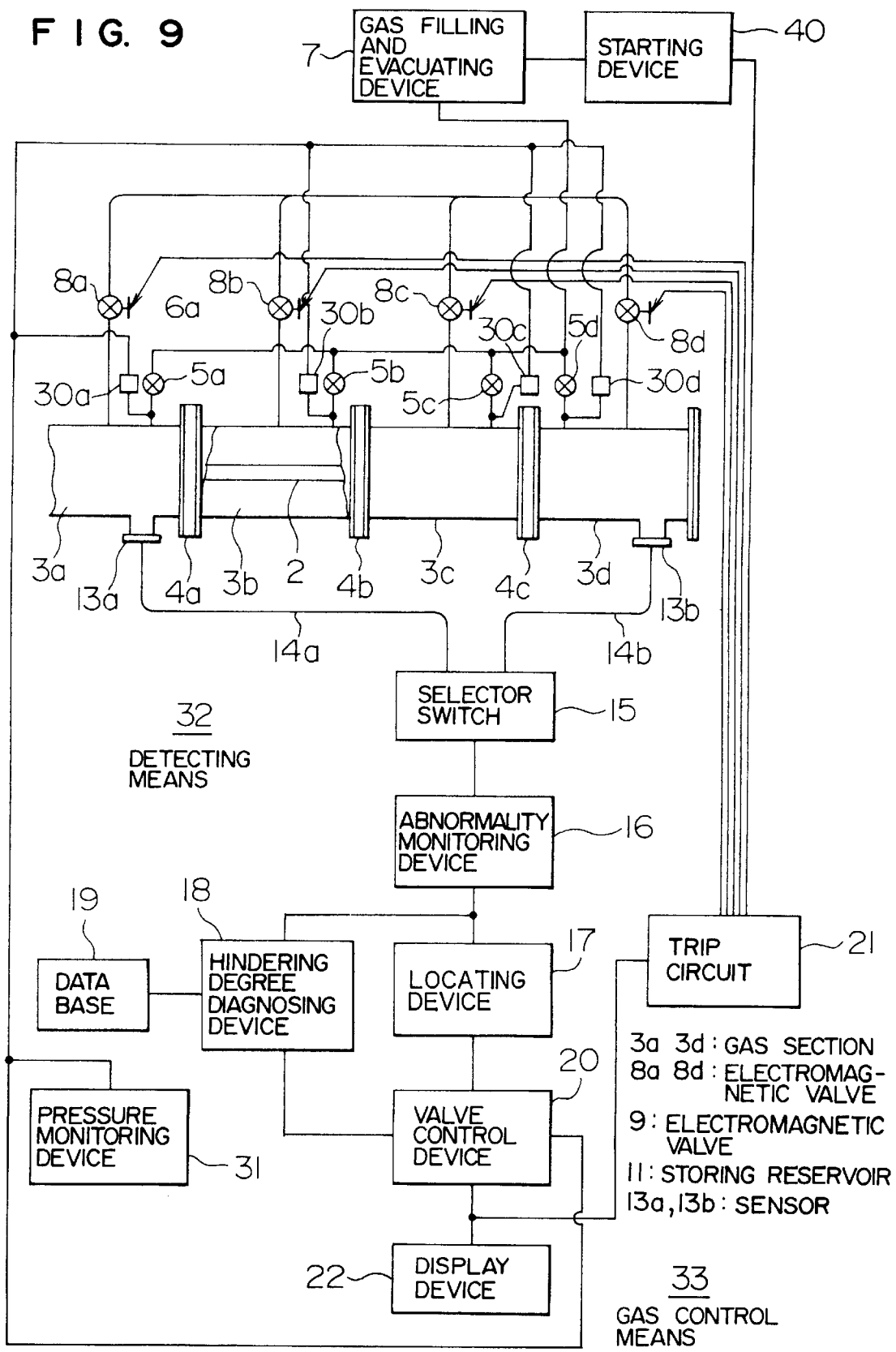
FIG. 9 is a block diagram of a second embodiment of an apparatus according to the present invention.

In the second embodiment as indicated in FIG. 9, the valve control device 20 receives pressure signals of the different gas sections from pressure relays 30a, 30b, 30c, 30d. The valve control device 20 supplies valve control signals to the trip circuit 21 in response to these pressure signals. The trip circuit 21 applies a signal to open the relevant valve to the electromagnetic valve 8b for the gas section 3b, in which insulation abnormalities are produced, responding to the valve control signal and at the same time supplies a drive starting signal to a starting device 40 to start the gas filling and evacuating device 7. The gas filling and evacuating device 7 started by the starting device 40 evacuates the insulating gas in the gas section 3b, in which insulating abnormalities are produced, through the closing valve 5b and the electromagnetic valve 8b of the gas section, until the gas pressure therein is lowered to a predetermined value. When the gas pressure in the gas section 3b is lowered to the predetermined value, the pressure relay 30b detects the relevant gas pressure and inputs a detection signal in the valve control device 20. The valve control device 20 stops the gas filling and evacuating device 7 through the starting device 40 and closes the electromagnetic valve 8b and the closing valve 5b.

FIG. 10 indicates variations of the flashover voltage, when metallic foreign particles having a diameter of 0.45 mm and a length of 5 mm and 10 mm are fixed in a space between coaxial cylindrical electrodes having an inner diameter of 100 mm and an outer diameter of 250 mm and the pressure of the $SF_6$ gas is varied between 1 and $6 \times 10^5$ Pa. Since usually $SF_6$ gas having a pressure higher than $5 \times 10^5$ Pa is used in a gas insulated electric apparatus, in the case where a 5 mm long metallic foreign particle is mixed therein, which gives rise to insulation abnormalities, the pressure is lowered to about $3 \times 10^5$ Pa, and in the case where a metallic foreign particle 10 mm long is mixed therein, the pressure is lowered to about $2 \times 10^5$ Pa, so that the flashover voltage can be raised to a value 1.4 to 2.3 time as higher than the initial flashover voltage.

Further, taking into account that the present invention is applied to a gas insulated electric apparatus in practice, since generation of metallic foreign matter producing insulation abnormalities takes place in gas sections having a circuit breaker section, an earth switch section or a disconnecting switch section, it can be expected to obtain a similar effect, even if the apparatus is so constructed that the gas control means are disposed, restricted to gas sections including opening and closing sections. Furthermore, since molecular sieves adsorbing gases produced by decomposition by arc an are disposed in such gas sections, it is preferable to choose insulating gases injected in these gas sections at insulation abnormalities which have molecular diameters greater than the pores in the molecular sieves (e.g. in a gas insulated apparatus, the molecular sieve having a pore diameter of substantially 4 Å is used commonly for absorbing water. In order to prevent an insulating gas from being absorbed into the molecular sieves, it is preferable to use an insulating gas having an effective diameter of greater than 4 Å, e.g., $C_4F_8$.) In this way, the injected insulating gases are not adsorbed by the molecular sieves, and the state where insulation strength is increased can be maintained for a long time.

Still further, instead of controlling the apparatus by using gas control means connected with gas sections through electromagnetic valves, it is possible also to vary the gas state in the gas sections, where insulation abnormalities are produced, by valve manipulation by an operator on the basis of an instruction from the detecting means detecting insulation abnormalities in the gas sections. Also by this method a similar effect can be expected. In addition, since no electromagnetic valves are used, the number of parts is decreased and thus reliability is increased. Further, since the vessel, in which gas is to be injected, is not always necessarily connected with the apparatus, but it may be connected manually at needs, it can be used in common by a plurality of substations and thus another effect can be obtained that economical efficiency is increased.

We claim:

1. A gas insulated electric apparatus, comprising:
   an elongated insulated electric device;
   a plurality of gas section members joined together to form a gas-tight body having said insulated electric device therein, extending between said gas section members, with each gas section member filled at a first pressure with only a first insulating gas;
   detecting means for detecting one of said gas section members having metal particles therein, causing an insulation abnormality on said insulated electric device;
   electromagnetic valve means connected to said gas section members;
   a gas storage reservoir storing a second insulating gas, different from the first insulating gas;
   gas filling means coupling said gas storage reservoir to said electromagnetic valve means and responsive to an output from said detecting means indicating detection of the insulation abnormality, for controlling said electromagnetic valve means to admit at least a portion of the second insulating gas into said gas section members so that within the gas section members the second insulating gas mixes with the first insulating gas and varies the pressure of the insulating gas mixture in said gas section members so as to increase insulation strength on said electric device therein.

2. A gas insulated electric apparatus according to claim 1, wherein the second insulating gas stored in said gas storage reservoir includes at least one of $C_4F_8$, $C_3F_8$, $C_3F_6$, $C_4F_6$, $C_2F_5COF$, $CF_3CN$, $C_2F_5CN$ and $CBrClF_2$.

3. A gas insulated electric apparatus as claimed in claim 1, wherein said detecting means comprises switching means for selectively coupling at least one of said gas section members to said gas filling means.

4. A gas insulated electric apparatus according to claim 1, wherein:
   (a) said detecting means comprises:
      sensor means disposed in each of at least two of said plurality of gas section members; and
      locating means responsive to a detection signal output from said sensor means for locating a position of said one of said plurality of gas section members at which an insulation abnormality exists;
   (b) said electromagnetic valve means includes a plurality of valve devices connected to said plurality of gas section members; and (c) said gas filling means comprises:

hindering degree diagnosing means for diagnosing the degree and the kind of insulation abnormality by comparing the detection signal output from said sensor means with data stored in a data base;

valve control means responsive to outputs of said locating means and said hindering degree diagnosing means for generating a first valve control signal;

trip circuit means responsive to the first valve control signal for generating a valve opening signal to open the valve device connected to said one of said gas section members;

insulating gas evacuating means for evacuating a portion of the first insulating gas from said one of said gas section members through the open valve device; and gas monitoring means for causing said valve control means to generate a second valve control signal to close the open valve device, when the optimum amount of the first insulating gas is in said one of said gas section members.

5. A gas insulated electric apparatus according to claim 1, wherein said gas filling means controls said electromagnetic valve means to increase the pressure of the insulating gas to a gas pressure greater than the insulating gas pressure prior to said detecting means detecting an insulation abnormality.

6. A gas insulated electric apparatus, comprising:

an elongated insulated electric device;

a plurality of gas section members joined together to form a gas-tight body having said insulated electric device therein, extending between said gas section members, with each gas section member filled at a first pressure with only a first insulating gas;

detecting means for detecting one of said gas section members having metal particles therein, causing an insulation abnormality on said insulated electric device;

a gas storage reservoir for storing a second insulating gas, different from the first insulating gas;

gas filling means coupling said gas storage reservoir to said gas section members and responsive to an output from said detecting means indicating detection of the insulation abnormality to admit at least a portion of the second insulating gas into said gas section members so that within the gas section members the second insulating gas mixes with the first insulating gas and varies the pressure of the insulating gas mixture in said gas section members so as to increase insulation strength on said electric device therein.

7. A gas insulated electric apparatus according to claim 6, wherein said gas filling means includes valve means responsive to the output from said detecting means for admitting at least a portion of the second insulating gas into said gas section members.

8. A gas insulated electric apparatus according to claim 7, wherein said valve means is one of a manually operated valve and an electromagnetic valve.

9. A gas insulated electric apparatus according to claim 8, wherein said valve means is a manually operated valve.

10. A gas insulated electric apparatus according to claim 8, wherein said valve means is an electromagnetic valve.

11. A gas insulated electric apparatus according to claim 6, wherein said gas filling means increases the pressure of the insulating gas to a gas pressure greater than the insulating gas pressure prior to said detecting means detecting an insulation abnormality.

12. A gas insulated electric apparatus according to claim 1, wherein:

(a) said detecting means comprises:

sensor means disposed in each of at least two of said plurality of gas section members; and locating means responsive to a detection signal output from said sensor means for locating a position of said one of said plurality of gas section members at which an insulation abnormality exists;

(b) said electromagnetic valve means includes a plurality of valve devices connected to said plurality of gas section members; and (c) said filling means comprises:

hindering degree diagnosing means for diagnosing the degree and the type of insulation abnormality by comparing the detection signal output from said sensor means with data stored in a data base;

valve control means responsive to outputs of said locating means and said hindering degree diagnosing means for generating a first value control signal;

trip circuit means responsive to the first value control signal for generating a valve opening signal to open the valve device connected to said one of said gas section members;

insulating gas filling means for supplying the second insulating gas from said gas storage reservoir through the open valve device to said one of said gas section members; and gas monitoring means for causing said valve control means to generate a second valve control signal to close the open valve device, when the optimum amount of the second insulating gas is in said one of said gas section members.

13. In a gas insulated electric apparatus, including a plurality of gas section members filled at a first pressure with only a first insulating gas and joined together to form a gas-filled body, with an insulated electric device within said gas-filled body and extending between gas section members, a method of controlling the insulation strength of said gas-filled body, said method comprising the steps of:

(a) detecting an insulation abnormality on said insulated electric device; and (b) in response to step (a), admitting a second insulating gas, different from the first insulating gas, into said gas section members to mix within said gas section members with the first insulating gas and to vary the gas pressure within said gas section members, so as to increase the insulation strength on the insulated electrical device.

14. A method as claimed in claim 13, further comprising the step of selecting as the second insulating gas at least one of $C_4F_8$, $C_3F_8$, $C_3F_6$, $C_4F_6$, $C_2F_5COF$, $CF_3CN$, $C_2F_5CN$, and $CBrClF_2$.

15. A method as claimed in claim 13, wherein step (a) comprises detecting metal particles within one of said gas section members.

16. A method as claimed in claim 13, wherein step (a) comprises comparing a detected signal indicative of an insulation abnormality with data stored in a data base, and diagnosing the degree and the kind of insulation abnormality based on the result of the comparison.

17. A method as claimed in claim 13, wherein step (b) comprises opening a valve device to admit the second insulating gas into said gas section members, monitoring the amount of the second insulating gas admitted into said gas section members, and closing said valve device when the optimum amount of insulating gas is in said gas section members.

18. A method as claimed in claim 13, wherein step (b) comprises admitting the second insulating gas to increase the gas pressure within the gas section members to a second gas pressure greater than the first gas pressure.

* * * * *